(12) United States Patent
Kurumatani et al.

(10) Patent No.: US 6,882,498 B2
(45) Date of Patent: Apr. 19, 2005

(54) MAGNETIC RECORDING/REPRODUCING DEVICE

(75) Inventors: Hiroshi Kurumatani, Hyogo (JP); Koichiro Hirabayashi, Osaka (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 235 days.

(21) Appl. No.: 10/159,390

(22) Filed: May 30, 2002

(65) Prior Publication Data

US 2002/0181144 A1 Dec. 5, 2002

(30) Foreign Application Priority Data

Jun. 4, 2001 (JP) ......................................... 2001-167980

(51) Int. Cl.⁷ .............................................. G11B 5/27
(52) U.S. Cl. ......................................................... 360/83
(58) Field of Search ........................... 360/83; 438/122; 439/248, 325, 326, 327, 328, 329; 361/756, 759, 801

(56) References Cited

U.S. PATENT DOCUMENTS

| | | | | |
|---|---|---|---|---|
| 4,730,237 A | * | 3/1988 | Locker | ....................... 361/740 |
| 4,914,552 A | * | 4/1990 | Kecmer | ....................... 361/801 |
| 5,028,829 A | * | 7/1991 | Cap et al. | ..................... 310/114 |
| 5,903,441 A | * | 5/1999 | Dean et al. | ................... 361/756 |
| 5,951,307 A | * | 9/1999 | Klein et al. | .................... 439/92 |
| 5,985,697 A | * | 11/1999 | Chaney et al. | ............... 438/122 |
| 6,113,402 A | * | 9/2000 | Joo | ............................. 439/157 |
| 6,174,185 B1 | * | 1/2001 | Cecil, Jr. | ..................... 439/248 |
| 6,358,079 B1 | * | 3/2002 | Noble | ......................... 439/328 |

* cited by examiner

Primary Examiner—A. J. Heinz
Assistant Examiner—Mark Blouin
(74) Attorney, Agent, or Firm—Renner, Otto, Boisselle & Sklar, LLP (57) ABSTRACT

A magnetic recording/reproducing device of the present invention includes: a chassis included in a mechanism section; a first protruded guide for maintaining a horizontal position of a board-like element attached to the chassis with respect to a horizontal plane of the chassis, the first protruded guide being provided on the chassis; and an arm rotatable with respect to the chassis, the arm is positioned so as to be out of contact with the board-like element when the board-like element is placed on the chassis before attachment thereto, and the arm is rotated about a rotation support axis center thereof so as to move to a position where the arm presses a top surface of the board-like element so that a vertical position of the board-like element with respect to a horizontal plane of the chassis is maintained for attachment of the board-like element to the chassis.

4 Claims, 6 Drawing Sheets

FIG. 7B Conventional Art

MAGNETIC RECORDING/REPRODUCING DEVICE

BACKGROUND OF THE INVENTION

1. Field of the Invention

The present invention relates to a magnetic recording/reproducing device which includes a mechanism for maintaining the position of a board-like element attached to a chassis of the magnetic recording/reproducing device.

2. Description of the Related Art

Recently, among magnetic recording/reproducing apparatuses, videotape camera-recorders are becoming more compact.

Similarly, operational elements mounted on a mechanism section of such a videotape camera-recorder are becoming more compact and thinner. Conductors for connecting electrical elements to the mechanism section are also becoming thinner, and the use of flexible printed circuits (hereinafter, referred to as the "FPC") as such a conductor is increasing.

Figure 6:
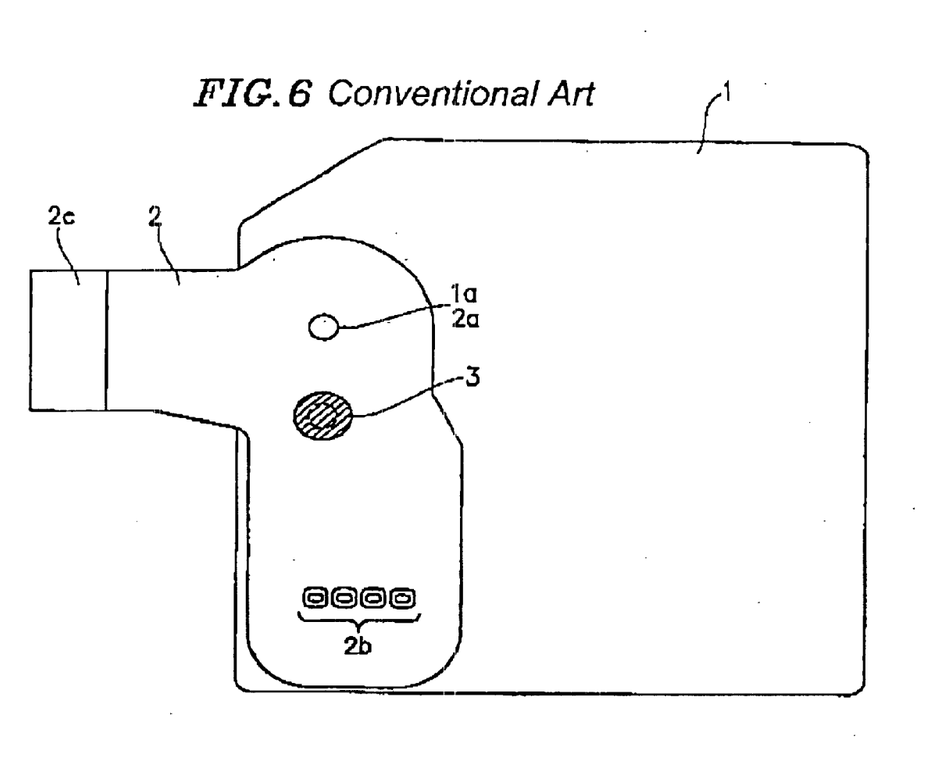
FIG. 6 is a top view showing a structure of conventional means for maintaining an FPC of a conventional magnetic recording/reproducing device.
Figure 7A:
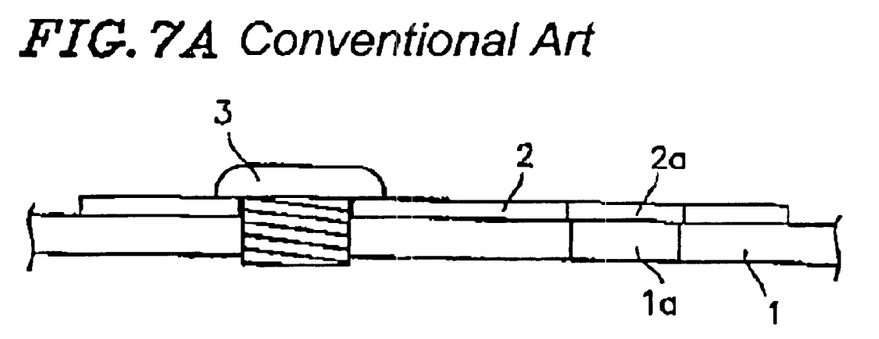
FIG. 7A is a side view showing a structure of conventional means for maintaining an FPC.
Figure 7B:
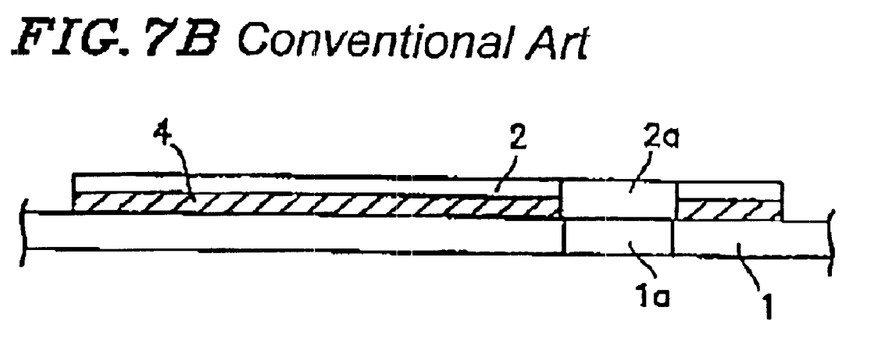
FIG. 7B is another side view showing a structure of conventional means for maintaining an FPC.

Referring to FIGS. 6, 7A and 7B, a conventional magnetic recording/reproducing device will be described below.

FIG. 6 is a top view showing a structure of means for maintaining the position of an FPC, which is a board-like element, of a conventional magnetic recording/reproducing device.

FIG. 7A is a side view showing a structure of means for maintaining the position of the FPC. FIG. 7B is a side view showing a structure of another means for maintaining the position of the FPC.

In FIG. 6, reference numeral 1 denotes a chassis included in a mechanism section of the conventional recording/reproducing device, reference numeral 1a denotes a chassis guide hole provided in the chassis 1, reference numeral 2 denotes an FPC and is attached to the chassis 1, reference numeral 2a denotes an FPC guide hole provided in the FPC 2 so as to have an axis common to that of the chassis guide hole 1a when the FPC 2 is placed in a prescribed horizontal position with respect to the horizontal plane of the chassis 1, reference numeral 2b denotes a soldering land on which a terminal of an electrical element (not shown) attached to the chassis 1 is soldered, reference numeral 2c denotes an insertion member included in the FPC 2 for insertion into electric circuitry, and reference numeral 3 denotes a fixing screw for screwing the FPC 2 to the chassis 1.

In FIGS. 7A and 7B, components having the same functions as those denoted in FIG. 6 are denoted by the same reference numerals. In FIG. 7B, reference numeral 4 denotes an adhesive (i.e., adhesive tape).

Construction of the above-described conventional magnetic recording/reproducing device will now be described with reference to FIGS. 6, 7A and 7B.

First, as shown in FIG. 6, the FPC guide hole 2a provided in the FPC 2 and the chassis guide hole 1a provided in the chassis 1 are aligned with each other using a pin (not shown) so as to place the FPC 2 in the prescribed horizontal position.

Next, the soldering land 2b provided to the FPC 2 is aligned with a terminal of an electrical element (not shown), thereby completing the placement of the FPC 2 with respect to the horizontal plane of the chassis 1.

Means for maintaining the vertical position of the FPC 2 with respect to the horizontal plane of the chassis 1 are described below. There are two types of such means as follows.

Referring to FIG. 7A, first maintaining means are described below.

After the placement of the FPC 2 with respect to the horizontal plane of the chassis 1, the FPC 2 is screwed to the chassis 1 using the fixing screw 3, so that the vertical position of the FPC 2 is maintained. Then, the terminal of the electrical element is soldered on the soldering land 2b, thereby completing the placement of the FPC 2 onto the chassis 1. In this case, the fixing screw 3 provides a maintaining effect which prevents the FPC 2 from being separated or lifted from the chassis 1 by force applied to the insertion section 2c, for example, when the insertion section 2c is inserted into the electric circuitry.

Referring to FIG. 7B, second maintaining means are described below.

After the placement of the FPC 2 with respect to the horizontal plane of the chassis 1, the FPC 2 is fixed to the chassis 1 using the adhesive 4, so that the vertical position of the FPC 2 is maintained. Then, the terminal of the electrical element is soldered on the soldering land 2b, thereby completing the placement of the FPC 2 onto the chassis 1. In this case, the adhesive 4 provides a maintaining effect which prevents the FPC 2 from being separated or lifted from the chassis 1 by force applied to the insertion section 2c.

However, the above-described conventional structures have the following problems.

In the case where the first maintaining means are used, a fixing screw is required for maintaining the position of a board-like element such as FPC 2, thereby increasing not only the number of assembly parts, but also the number of the assembly steps including the fastening of the screw and providing a screw hole in the chassis. The thickness of the assembled structure is also increased due to the added thickness of the fixing screw.

In the case where the second maintaining means are used, an adhesive (tape) is required to be preattached on the FPC, thereby increasing the cost of the FPC. Further, the FPC has a board-like shape, and thus a greater number of the steps are required to accurately attach and position the FPC to the chassis in comparison to a case where the FPC is merely mounted on the chassis.

Furthermore, in order to maintain adhesiveness of the FPC with respect to the chassis, a degreasing process is required to be performed on both the FPC and the chassis for the purpose of preventing the FPC from being separated from the chassis, thereby increasing the production cost and the number of production steps. Further still, detergent is used in the degreasing process, and such detergent aggravates global environment problems.

The present invention provides solutions to the above-described problems with conventional magnetic recording/reproducing devices.

SUMMARY OF THE INVENTION

According to one aspect of the present invention, there is provided a magnetic recording/reproducing device including: a chassis included in a mechanism section; a first protruded guide for maintaining a horizontal position of a board-like element attached to the chassis with respect to a horizontal plane of the chassis, the first protruded guide being provided on the chassis; and an arm incorporated into the chassis by outsert molding so as to be rotatable with respect to the chassis, the arm is positioned so as to be out of contact with the board-like element when the board-like element is placed on the chassis before attachment thereto, and the arm is rotated about a rotation support axis center thereof so as to move to a position where the arm presses a top surface of the board-like element so that a vertical position of the board-like element with respect to a horizontal plane of the chassis is maintained for attachment of the board-like element to the chassis.

In one embodiment of this invention, a second protruded guide is provided on the chassis such that movement of the arm is not stopped due to a difference in a vertical level between an edge of the board-like element and the chassis when the arm is moved toward the top surface of the board-like element.

In one embodiment of this invention, a third protruded guide is provided on the chassis such that a rotating angle of the arm is limited so as to maintain pressing contact between the top surface of the board-like element and the arm.

In one embodiment of this invention, the board-like element is a flexible printed circuit.

Thus, the invention described herein makes possible the advantages of providing a magnetic recording/reproducing device including an FPC maintaining mechanism which is characterized in that: (1) a screw for fixing an FPC on a chassis of the device is not required, whereby the number of assembly parts is not unnecessarily increased and the steps of fastening the screw and making a screw hole in a chassis of the device are not required, and (2) an adhesive for fixing the FPC on the chassis of the device is not required, whereby an additional cost of such an adhesive and the step of accurately attaching and positioning the FPC to the chassis are not required, so that a degreasing process required to prevent the adhesive from being separated from the FPC and the use of detergent are not required, making the magnetic recording/reproducing device easily assembled, less costly and eco-friendly.

These and other advantages of the present invention will become apparent to those skilled in the art upon reading and understanding the following detailed description with reference to the accompanying figures.

DESCRIPTION OF THE PREFERRED EMBODIMENTS

A magnetic recording/reproducing device of the present invention includes: a chassis included in a mechanism section; a first protruded guide for maintaining a horizontal position of a board-like element attached to the chassis with respect to a horizontal plane of the chassis, the first protruded guide being provided on the chassis; and an arm incorporated into the chassis by outsert molding so as to be rotatable with respect to the chassis, the arm being positioned so as to be out of contact with the board-like element when the board-like element is placed on the chassis before attachment thereto, and the arm being rotated about a rotation support axis center thereof so as to move to a position where the arm presses a top surface of the board-like element so that a vertical position of the board-like element with respect to the horizontal plane of the chassis is maintained for attachment of the board-like element to the chassis, thereby maintaining the horizontal and vertical positions of the board-like element with respect to the chassis without requiring additional attachment elements.

In the magnetic recording/reproducing device of the present invention, a second protruded guide is provided on the chassis such that movement of the arm is not stopped due to a difference in a vertical level between an edge of the board-like element and the chassis when the arm is moved toward the top surface of the board-like element.

In the magnetic recording/reproducing device of the present invention, a third protruded guide is provided on the chassis such that a rotating angle of the arm is limited so as to maintain pressing contact between the top surface of the board-like element and the arm.

Hereinafter, examples of the present invention will be described with reference to FIGS. 1 through 5C.

EXAMPLE 1

Figure 1:
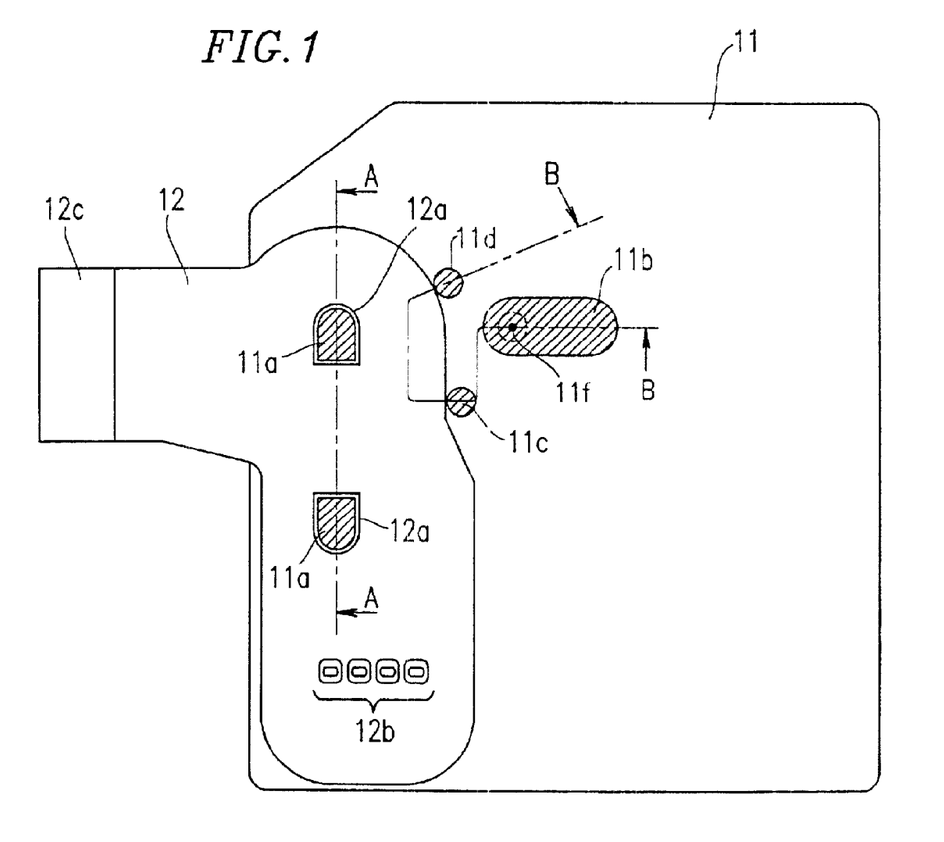
FIG. 1 is a top view showing a structure of a magnetic recording/reproducing device according to an example of the present invention.

FIG. 1 is a top view showing a structure of a magnetic recording/reproducing device according to Example 1 of the present invention. In FIG. 1, reference numeral 11 denotes a chassis included in a mechanism section of the magnetic recording/reproducing device for mounting operational elements of the device, reference numeral 11a denotes a first protruded guide provided on the chassis 11 (in Example 1, two first protruded guides 11a are provided), reference numeral 11b denotes an arm incorporated into the chassis 11 by outsert molding so as to be rotatable with respect to the chassis 11, reference numeral 11f denotes a rotation support axis center of the arm 11b, reference numeral 11c denotes a second protruded guide provided on the chassis 11, reference numeral 11d denotes a third protruded guide provided on the chassis 11, reference numeral 12 denotes an FPC (flexible printed circuit) placed on the chassis 11, reference numeral 12a denotes an FPC guide hole provided in the FPC 12 which is guided by the protruded guide 11a to a prescribed position, reference numeral 12b denotes a soldering land on which a terminal of an electrical element (not shown) attached to the chassis 11 is soldered, and reference numeral 12c denotes an insertion member included in the FPC 12 which is inserted into electric circuitry.

Components shown in FIGS. 2 through 5C have the same names and the same reference numerals as those components shown in FIG. 1, and thus descriptions thereof are omitted.

The construction and operation of the magnetic recording/reproducing device according to Example 1 of the present invention will now be described with reference to FIGS. 1 through 5.

FIG. 1 shows a state where the FPC 12 is placed on the chassis 11. The horizontal position of the FPC 12 is fixed by the two first protruded guides 11a and the two guide holes 12a. The soldering land 12b provided on the FPC 12 is placed in a prescribed position so as to align with a terminal of an electrical element (not shown).

Figure 2:
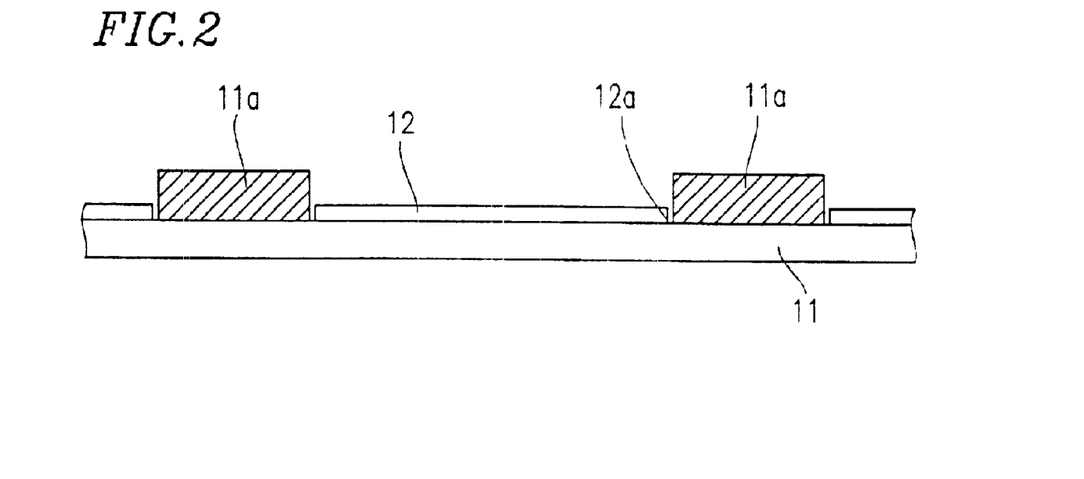
FIG. 2 is a cross-sectional view of the magnetic recording/reproducing device according to the present invention taken along line A—A shown in FIG. 1.

FIG. 2 is a cross-sectional view showing a schematic structure of the magnetic recording/reproducing device according to Example 1 of the present invention taken along line A—A shown in FIG. 1. When the FPC 12 is placed in the prescribed position shown in FIG. 2, the FPC guide holes 12a are positioned such that the first protruded guides 11a provided on the chassis 11 project through the FPC guide holes 12a, and thus the horizontal position of the FPC 12 with respect to the horizontal plane of the chassis 11 is fixed.

Figure 3A:
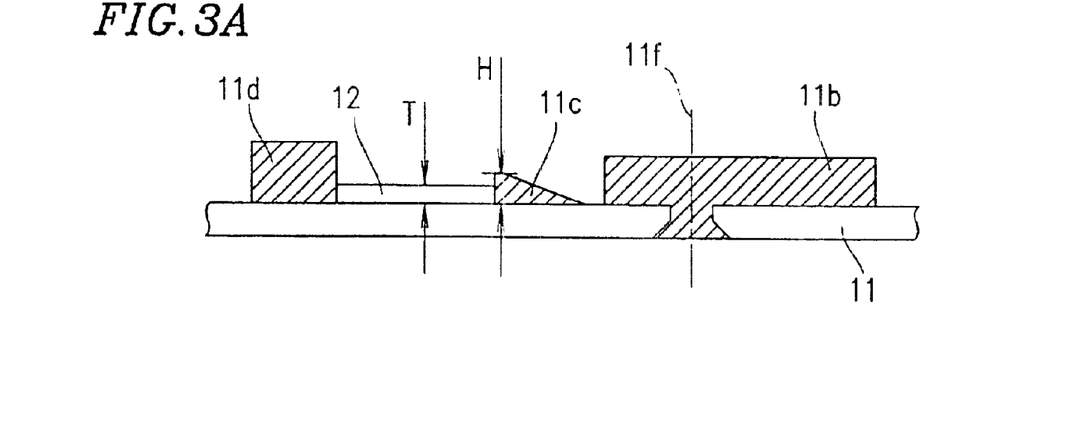
FIG. 3A is a cross-sectional view for explaining the operation of the magnetic recording/reproducing device according to the present invention taken a long line B—B shown in FIG. 1.
Figure 3B:
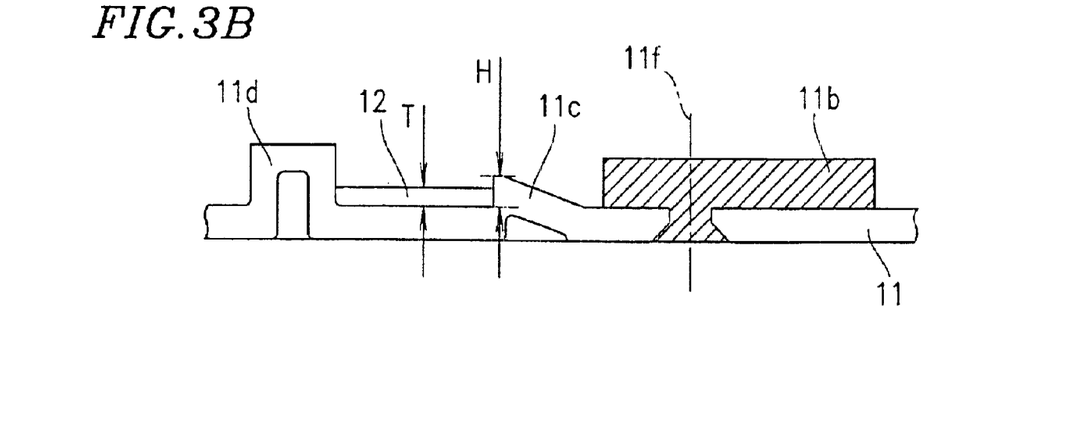
FIG. 3B is another cross-sectional view for explaining the operation of the magnetic recording/reproducing device according to the present invention taken along line B—B shown in FIG. 1.

FIGS. 3A and 3B show relationships among the chassis 11, the FPC 12, the arm 11b, and the second and third protruded guides 11c and 11d along line B—B shown in FIG. 1. In FIG. 3A, the second and third protruded guides 11c and 11d are formed by outsert molding on the chassis 11. In FIG. 3B, the chassis 11 includes the second and third protruded guides 11c and 11d (i.e., the second and third guides 11c and 11d are integrally formed with the chassis 11). Either of theses structures shown in FIGS. 3A and 3B can be applied to Example 1 of the present invention. In both structures shown in FIGS. 3A and 3B, the arm 11b is supported by the chassis 11 so as to be rotatable about the rotation support axis center 11f thereof, the second guide 11c is fixed to the chassis 11 and is tapered off toward the direction of the arm 11b with respect to the second guide 11c. When the maximum height of the second protruded guide 11c is H (i.e., the height at the top surface of the tapered section of the second guide 11c) and the height (thickness) of the FPC 12 is T, a relationship between H and T is represented as T<H.

The third guide 11d is fixed to the chassis 11, and the height thereof is determined so as to limit a rotating angle of the arm 11b. That is, the height of the third guide 11d is greater than that of the FPC 12 and sufficient so as to stop the movement of the arm 11b.

Figure 4:
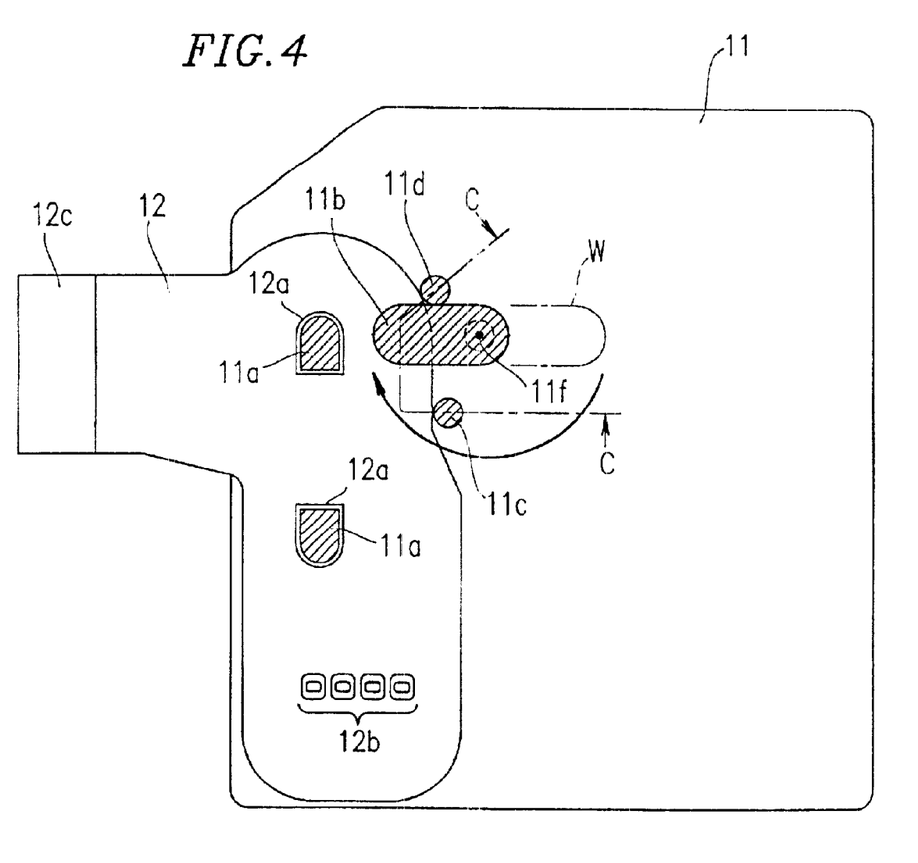
FIG. 4 is a top view for explaining the operation of the magnetic recording/reproducing device of FIG. 1.

The operation of an FPC pressing mechanism according to Example 1 of the present invention is now described with reference to FIG. 4. FIG. 4 shows a structure of the FPC pressing mechanism for attaching the FPC 12 to the chassis 11. The arm 11b is rotated along a (clockwise) direction denoted by the arrow so as to move from a standby position W (the position of the arm 11b shown in FIG. 1; shown with a broken line in FIG. 4) to a position where the arm 11b comes into contact with the third guide 11d and presses the top surface of the FPC 12. This movement of the arm 11b allows the vertical position of the FPC 12 with respect to the horizontal plane of the chassis 11 to be maintained. The attachment of the FPC 12 to the chassis 11 is completed by soldering a terminal of an electrical element to the soldering land 12b. In this structure, the arm 11b provides a maintaining effect which prevents the FPC 12 from being separated or lifted from the chassis 11 by force applied to the insertion section 12c, for example, when the insertion section 12c is inserted into electric circuitry.

Figure 5A:
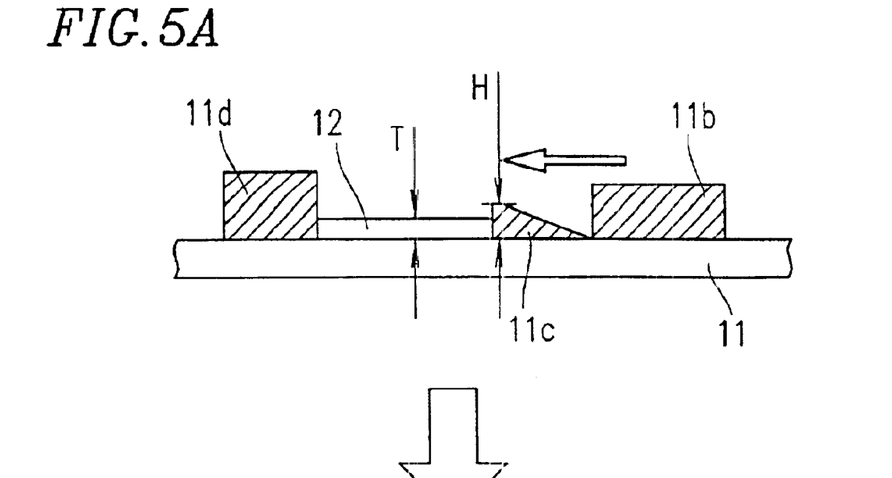
FIG. 5A is a cross-sectional view of the magnetic recording/reproducing device according to the present invention taken along line C—C shown in FIG. 4.
Figure 5B:
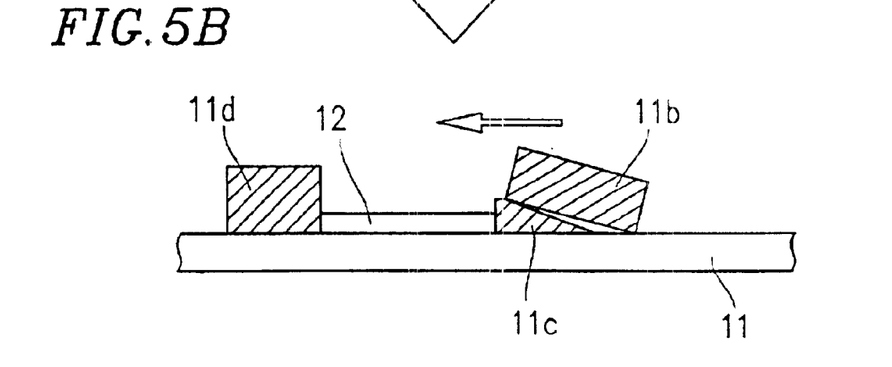
FIG. 5B is another cross-sectional view of the magnetic recording/reproducing device according to the present invention taken along line C—C shown in FIG. 4.
Figure 5C:
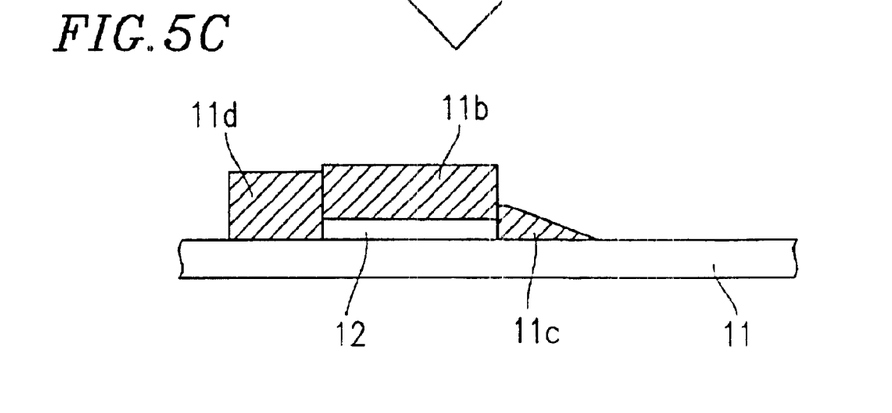
FIG. 5C is yet another cross-sectional view of the magnetic recording/reproducing device according to the present invention taken along line C—C shown in FIG. 4.

Each of FIGS. 5A–5C is a cross-sectional view showing a schematic structure of the magnetic recording/reproducing device taken along line C—C shown in FIG. 4 and shows a relationship between the arm 11b and the other elements during the rotation of the arm 11b along the (clockwise) direction shown by the arrow in FIG. 4. Although FIGS. 5A through 5C show this relationship with respect to the outsert molded structure of FIG. 3A, the operation shown in FIGS. 5A through 5C is also applicable to the integrated structure of FIG. 3B.

In FIG. 5A, the arm 11b is rotated so as to come into contact with an edge of the second guide 11c.

In FIG. 5B, the arm 11b is further rotated along the tapered (inclined) surface of the second guide 11c, so that the arm 11b is lifted to the height H of the second guide 11c.

In FIG. 5C, the arm 11b is further rotated such that the arm 11b moves over the second guide 11c to a position where the arm 11b presses the top surface of the FPC 12 and the movement of the arm 11b is stopped at a position where the arm 11b comes into contact with the third guide 11d. This movement of the arm 11b allows the vertical position of the FPC 12 with respect to the horizontal plane of the chassis 11 to be maintained. Since the height of each of the second and third guides 11c and 11d is greater than that of the FPC 12, the horizontal position of the arm 11b is fixed between the second and third guides 11c and 11d and is not undesirably moved from therebetween (i.e., until a user forcibly moves the arm 11b from between the guides).

The vertical position of the FPC 12 is also maintained by the arm 11b, thereby preventing the FPC 12 from being separated or lifted from the chassis 11.

As described above, according to Example 1 of the present invention, in order to attach a flexible printed circuit (FPC) to a chassis of a mechanism section mounting operational elements for a magnetic recording/reproducing device, protruded guides are provided on the chassis and an arm is incorporated into the chassis using outsert molding so as to be rotatable with respect to the chassis, whereby it is possible to rotate the arm about a rotation support axis center thereof and to move the arm to a position where the arm presses the top surface of the FPC so as to maintain the vertical and horizontal position of the FPC on the chassis with respect to a horizontal plane of the chassis. Thus, an attachment screw, adhesive or the like are not necessary for attachment and positioning of the FPC to the chassis, whereby it is possible to realize an FPC mechanism which is easy to assemble, cost effective and eco-friendly.

Further, by providing a tapered guide adjacent the FPC in a path along which the arm moves, it is possible to smoothly move the arm onto the FPC for pressing, and by providing another guide which stops the movement of the arm once pressing the FPC, it is possible to fix the position of the arm.

In the above-description, although the FPC is used as a board-like element, a sheetmetal mechanism element can be used as the board-like element, for example.

As described above, the present invention provides a magnetic recording/reproducing device including an FPC maintaining mechanism which is characterized in that: (1) a screw for fixing an FPC on a chassis of the device is not required, whereby the number of assembly parts is not unnecessarily increased and the steps of fastening the screw and making a screw hole in a chassis of the device are not required, and (2) an adhesive for fixing the FPC on the chassis of the device is not required, whereby an additional cost of such an adhesive and the step of accurately attaching and positioning the FPC to the chassis are not required, so that a degreasing process required to prevent the adhesive from being separated from the FPC and the use of detergent are not required, making the magnetic recording/reproducing device easily assembled, less costly and eco-friendly.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording/reproducing device, comprising:
a chassis included in a mechanism section;
a first protruded guide for maintaining a horizontal position of a board-like element attached to the chassis with respect to a horizontal plane of the chassis, the first protruded guide being provided on the chassis; and
an arm incorporated into the chassis by outsert molding so as to be rotatable with respect to the chassis,
wherein the arm is positioned so as to be out of contact with the board-like element when the board-like element is placed on the chassis before attachment thereto, and
the arm is rotated about a rotation support axis center thereof so as to move to a position where the arm presses a top surface of the board-like element so that a vertical position of the board-like element with respect to a horizontal plane of the chassis is maintained for attachment of the board-like element to the chassis.

2. A magnetic recording/reproducing device according to claim 1, wherein a second protruded guide is provided on the chassis such that movement of the arm is not stopped due to a difference in a vertical level between an edge of the board-like element and the chassis when the arm is moved toward the top surface of the board-like element.

3. A magnetic recording/reproducing device according to claim 1, wherein a third protruded guide is provided on the chassis such that a rotating angle of the arm is limited so as to maintain pressing contact between the top surface of the board-like element and the arm.

4. A magnetic recording/reproducing device according to claim 1, wherein the board-like element is a flexible printed circuit.

* * * * *